United States Patent [19]

Nathan et al.

[11] 4,004,572

[45] Jan. 25, 1977

[54] SOLAR ENERGY COLLECTION AND RETRIEVAL EMPLOYING REVERSIBLE PHOTOCHEMICAL ISOMERIZATION

[75] Inventors: Richard A. Nathan; Robert E. Schwerzel; Albert H. Adelman, all of Columbus; Robert E. Wyant, Delaware, all of Ohio

[73] Assignee: Battelle Development Corporation, Columbus, Ohio

[22] Filed: June 30, 1975

[21] Appl. No.: 592,029

[52] U.S. Cl. .............................. 126/270; 126/400; 204/158 R

[51] Int. Cl.² ........................ F24H 7/00; F24J 3/02

[58] Field of Search ................ 204/158 R; 126/270, 126/271, 400

[56] References Cited

UNITED STATES PATENTS

| | | | |
|---|---|---|---|
| 2,677,664 | 5/1954 | Telkes | 126/270 C |
| 3,957,030 | 5/1976 | Davis | 126/270 |

*Primary Examiner*—Howard S. Williams

*Attorney, Agent, or Firm*—Kenneth R. Warburton

[57] ABSTRACT

A process for photochemical collection, storage, and retrieval of solar energy, including solar energy in the visible and near-infrared light spectrum, comprising: exposing to solar radiation of a trans-isomer of particular geometrically isomerizable compounds, while dissolved in a predominantly (greater than 50 percent by volume) aqueous liquid medium, to isomerize the trans-isomer to a thermodynamically less stable, but kinetically stable, cis-isomer of higher energy content, heating the produced cis-isomer to an activation temperature triggering exothermal conversion (or return) of the cis-isomer to the trans-isomer with release of thermal energy; and continuing exothermal conversion of cis-isomer to trans-isomer through use of a portion of the exothermically released thermal energy and transferring of another portion of the released thermal energy from the region of exothermal conversion for availability of this other portion for useful thermal energy applications; with the therein employed geometrical isomerizable compound being possessed of defined properties including the properties of both the trans-isomer and cis-isomer having light absorbance maxima lying between the wavelengths of 350 and 800 nm with the absorbance maxima of the cis-isomer occuring at a shorter wavelength than the absorbance maxima of the trans-isomer, and being selected from compounds having these defined properties and certain structural formulae.

13 Claims, 3 Drawing Figures

Fig. 1

SOLAR ENERGY COLLECTION AND RETRIEVAL EMPLOYING REVERSIBLE PHOTOCHEMICAL ISOMERIZATION

This invention concerns photochemical collection, storage, and retrieval of solar energy with employment of a photochemical isomerizable composition in the visible light spectrum of solar radiation undergoing a geometrical isomerization (e.g., trans to cis isomerization) from a thermodynamically stable isomer of lower energy content to a thermodynamically less stable, but kinetically stable, isomer of higher energy content. More particularly, the invention's method includes exposure to solar radition of a thin liquid layer, containing the lower energy level isomer, for a time sufficient to isomerization at least a significant portion thereof to its higher energy level isomer, and a subsequent heat-triggering conversion of the higher energy level isomer to its lower energy level isomer with a portion of the released thermal energy being utilized to continue the heat-triggering conversion and with another portion thereof being available for useful thermal energy applications and purposes.

BACKGROUND

The use of sunlight (i.e., solar energy) to supply human needs for energy is of prime importance in view of man's depletion of more conventional energy sources such as fossil fuels of coal, oil, and the like.

PRIOR ART

One known approach to solar energy collection and utilization, termed herein a "conventional" thermal solar energy system, is based upon the heat produced when a blackened surface is exposed to sunlight. Such a system utilizes a solar collector in which a sheet of blackened metal serves to heat a working fluid, typically air, water, or water-glycol mixtures. The use of flat plate collectors is preferable to the use of the parabolic type, not only because the latter is considerably more expensive, but also because flat plate collectors can more efficiently utilize diffuse radiation. In such a system, the working fluid, e.g., water, is circulated through the collector (often over the plate or through tubes or the like affixed to the back side of the blackened plate collector) causing the fluid to absorb sensible heat (rise in temperature). There are, of course, many modifications possible to such a system, but in the simplest the hot fluid then is stored in an "energy storage tank" where it is held until the energy is needed for heating or cooling purposes. At that time the hot fluid can be drawn off to run an air conditioning or heating system. During this heating or cooling process, the fluid loses much or all of its sensible heat (energy) and then is recirculated to the collector to pick up additional energy. The simplicity, safety, and potentially low operating cost of thermal solar energy systems have already led to the commercial installation of prototype systems for applications, such as the heating of water for homes, offices, schools, libraries, and apartment complexes in some locations throughout the world.

However, a number of problems and disadvantges are inherent in a conventional thermal solar energy system. Maximum instantaneous efficiency of present-day flat-plate collectors is only about 40 percent. More realistically, an average daily collection efficiency on a sunny day might approach 20 percent. That is, given a solar flux capable of delivering 1.0 million Btu/day to a collector, water circulated through the collector could gain only about 0.2 million Btu/day, primarily because of optical and thermal losses. Additionally, a serious limitation to the thermal system is that the system can operate effectively only so long as there is appreciable sunlight. That is, in a thermal solar energy system there is a threshold value of light necessary before the system can be put in use. Furthermore, a thermal system will incorporate some type of short-term heat storage such as heated water, rock, or eutectic salt mixtures to smooth out the operation of the system during the night and during cloudy periods. The cost of the thermal system, including principally the cost of the collector and insulated storage, is such that it is impractical to store more heat in this way than can operate a building's heating and cooling system for a period between several hours and a few days. As a result, there are drawbacks with thermal systems which have to operate throughout the winter in the highly populated temperature-zone climates distant from the equator, where there is both cold weather and considerable cloud cover. The collector must heat up to an operating temperature before the system can be turned on. Even on bright winter days in such climates, the system might be usable for only 2 or 3 hours each day. On cold, cloudy days, it is doubtful that a thermal solar energy system could be used at all. During such periods when the thermal solar energy system is unable to operate, an auxiliary energy source (e.g., electricity) needs to be available and used to supply energy for a consumer system's needs.

Other approaches taught for solar energy collection and utilization have sought to employ various principles and means, such thermoelectric conversion based on solar heating of one junction of a thermocouple of dissimilar metals (Seebeck principle), and photovoltaic conversion of solar radiation directly to electrical power by photovoltaic cells. These approaches also have limitations and disadvantages, a principal one that of being much too expensive for general use.

Photochemical conversion of solar radiation is another approach for converting solar energy into useful work. Biological photochemical processes occur naturally and are well illustrated by photosynthesis in plants and the like. Non-biological photochemical conversions also are found to some extent in nature and also have been investigated to some extent for a controlled converting and supplying of energy needs from solar energy. The photochemical approaches include the effects of solar energy on molecular dissociation, rearrangement, or chemical reaction, or the like. Such photochemical processes and conversion are described by J. G. Calvert in "Photochemical Processes for Utilization of Solar Energy", pages 190–210, in *Introduction to the Utilization of Solar Energy*, edited by A. M. Zarem and D. D. Erway, McGraw-Hill, New York, 1963, and by Farrington Daniels in Chapter 17, "Photochemical Conversion", pages 299–329, in *Direct Use of the Sun's Energy*, Yale University Press, New Haven and London, 1964. The last mentioned includes teachings such as: "There are no promising laboratory photochemical reactions now for storing and using solar energy . . . "; "Photopolymerizations and photoisomerizations provide another group of reversible reactions suitable for consideration in the photochemical storage of sunlight"; and "The photoisomerization of maleic acid stores 70 cal $g^{-1}$ and the reversal is slow; the photoisomerization of stilbene stores 57 cal $g^{-1}$, but these reactions respond only to ultraviolet light."

B. H. Clampitt and D. E. German, in SAE Journal, May, 1960, pages 52–54, "Solar-to-Electric Energy", describe a two-stage device for converting solar energy into electrical energy with the first stage involving solar-to-chemical energy through photochemical trans to cis isomerization of certain organic acids.

U.S. Pat. No. 1,782,259 relates to light-sensitive layers containing as a light-sensitive substance an ethylene derivative forming cis-trans-isomerides for making of photographic images rather than any collection and retrieval of solar energy in significant amounts with mention of only a few isomerides, e.g., maleic and fumaric acids, trans-dibenzoylethylene, etc. However, in contrast to the limited isomerization art teachings in solar energy collection and retrieval and utilization, in the photosensitive, photographic, and like arts there are numerous teachings found of trans- and cis-isomers and their usage. For example: isomeric isocyanatostilbenes are taught as useful optical brightening agents in U.S. Pat. No. 3,555,071; cyanine compounds for image reproduction and for spectral sensitizing dyes are taught in U.S. Pat. Nos. Re. 28,225 and 3,758,465, respectively; other cyanine compounds for print-out films and light sensitive emulsions are taught in U.S. Pat. Nos. 3,615,562 and 3,632,808; a photochromic display and storage device involving trans- and cis-indigoids is taught in U.S. Pat. No. 3,715,212. Numerous additional patent art is available on photochemical isomerizable materials, but so far as is known none is believed explicity to teach their materials for direct usage per se through geometrical isomerization for collection, retrieval, and release for useful energy purposes of solar energy in the visible spectrum in significant amounts.

Principles for Photochemical Solar Energy Collection and Retrieval

An attractive alternative to a thermal solar conversion and storage system is one in which the solar energy could be stored chemically, by means of a photochemical reaction which is reversible on demand as shown by the following reactions:

Energy Collection: Photochemical and light → Stable High Energy Chemical(s)

Energy Release: Stable High Energy Chemical(s) → Photochemical plus Heat

In principle, such a system can operate to some extent at any time during the daylight hours. As contrasted with the threshold behavior of thermal systems, the photochemical reaction will proceed so long as some light is present, although, of course, the extent of reaction increases with increasing sunlight. The system could be started immediately at sunrise without waiting for the collector to reach high temperature, and could be run continuously until sundown. Since by definition the photochemical reaction will produce a product(s) with a higher energy content than that of the starting material, some of this chemically stored energy can be used immediately, in conjunction with any sensible heat picked up by the material during passage through the collector. The remaining high energy product(s) which accumulates during the day can be held in a storage tank(s) until needed. In the instances where the collection step or reaction involves a chemical dissociation, the resulting dissociated products can be stored separately and upon being remixed caused to reassociate to provide the energy release. In other instances where the solar energy collection provides a single stable high energy chemical, one provides means, e.g., radiation of a specific wave length or heat, to trigger energy release therefrom and regeneration of the starting photochemical. Fundamental considerations for a suitable photochemically active material are that it:

1. absorb as much of the solar spectrum as possible;
2. undergo an efficient photochemical reaction in the presence of sunlight to give a product(s) of higher energy content than the original material. Since this process provides the energy storage, it is desired to have the energy content of the product(s) as high as possible;
3. be regenerated readily upon demand from the high energy product(s) with concurrent release of the stored energy as heat; and
4. accomplish the above with little to no deterioration.

DRAWINGS

In the drawings:

FIG. 1 illustrates a simplified energy profile diagram of the photochemical geometrical isomeric system of the invention;

FIG. 2 presents another more detailed diagrammatic representative of the energy profile of the system of the invention; and FIG. 3 presents a diagrammatic illustration of the energetics of triplet sensitization.

SUMMARY STATEMENT OF THE INVENTION

In the present invention the employed photochemical isomerizable composition (described in detail hereafter), while dissolved and/or dispersed in water or an aqueous liquid medium (described more fully hereafter) is exposed to solar radiation and is responsive photochemically to solar energy in the visible light and near-infrared spectrum (i.e., between 350 and 1200 nm) to form its geometrical isomer of higher energy content. This composition containing the isomeric form of higher energy content generally then is stored until such time as energy is desired to be recovered therefrom. If stored, storage most likely is at ambient temperature or the temperature reached during the photoconversion of trans to cis isomer. Alternatively, shortly after its formation the higher energy isomer is used to retrieve energy therefrom and this retrieved energy stored by another means such as thermal energy heat-exchanged to a fluid medium for storage or the like. In retrieval of the stored solar energy, the isomeric form of higher energy content is "triggered" by heat and caused to revert and return to its original and initial isomeric form of lower energy content with an accompanying exothermic release of heat. A portion of this recovered heat is employed to continue the triggered conversion to the lower energy level isomer. The remaining heat is used as heat energy per se (e.g., to heat a residence, to run a heat pump or heat engine, etc.), stored for later usage, or converted to another energy form for usage or storage. Upon return of the isomerizable composition to its isomeric form of lower energy content, ths isomerizable composition is available for re-exposure to solar energy and its conversion again to its isomeric form of higher energy content and with repetition of the precedingly described procedural sequence of collection, storage, and retrieval of its stored energy. The reversion or return of the higher energy level isomer to its lower energy level isomer can be initiated and/or triggered through an initial application of heat thereto and/or exposure to catalysts, after which the reverse isomerization being exothermic is self-sustaining with there obtained a release of heat in excess of that heat needed to sustain the reverse isomerization. Certain catalysts (described more fully hereafter) can be used to initiate and facilitate the reverse isomerization of the photochemical isomerizable compositions.

As a simplified illustration of the overall mechanism of the system of the invention, a trans-isomer in a photochemical composition upon solar radiation in the visible and near-infrared light spectrum converts at least in part to its higher energy level cis-isomer which for energy retrieval under heat and/or catalyst is triggered to convert exothermically to its original lower energy level trans-isomer. With reference to FIG. 1, which presents a simplified energy profile diagram of the photochemical geometrical isomeric system of the system of the invention, the illustrated cis-isomer C is of considerable (e.g., 50 + cal/gm) higher energy than the trans-isomer T. In FIG. 1, the vertical coordinate is the energy level E and the horizontal coordinate is the reaction coordinate. Also in FIG. 1,

- $\Delta E_F$ is the activation energy for the forward or energy storage reaction and represents an approximation to the minimum amount of energy needed from the sun for each molecular reaction.
- $\Delta E_R$ is the activation energy for the reverse or energy releasing reaction and is a measure of the stability of the cis-isomer to leakage to trans, and thus controls the storage potential.
- $\Delta E$ is the energy difference between the trans and cis isomers and is the net energy stored in the cis form for release when needed.

The illustrated system functions as follows:

$T \xrightarrow[\text{(Sensitizer optional)}]{\text{Sunlight}} C$ (absorption of solar energy as high energy cis-isomer) I $C \xrightarrow[\text{(plus preferably catalyst)}]{\text{heat}} T$ + heat (recovery of heat from cis-isomer) II The two reactions shown are a photochemical (or foward) reaction I during which the trans-isomer is converted to its cis-isomer and a thermal (or back) reaction II during which the cis-isomer is reconverted to the trans-isomer with release heat.

The representation of the photochemical reaction in FIG. 1 has been quite simplified. A better representation of the phenomenon involves photochemically excited states as shown in FIG. 2. In general, the trans-isomer (T), (reactant) becomes electronically excited to a high-energy state (T*) upon exposure to sunlight of energy $h\nu$ or greater. Reaction to T* to give the cis-isomer (C), (product) is accompanied by the immediate release of some heat, $E_h$, which corresponds to the energy difference between T* and C. The stored energy, $\Delta E$, then is recovered when needed by heating C sufficiently to overcome the reverse activation energy $\Delta E_R$. This drives the system back to the original composition, i.e., predominantly trans-isomer (T), along the lower curve. The following factors generally then are considered in arriving at an optimum photochemical material to employ in the invention.

1. The energy of T* should be low, so as to extend the absorption spectrum of the material as far toward and/or into the infrared as possible. It will be recognized that more energetic photons will still be absorbed, with the excess energy over T* appearing in the system as heat.
2. The energy difference between the cis- and trans-isomers, $\Delta E$, should be great, as this is the amount of energy which the sytsem is capable of storing.
3. The reverse activation energy $\Delta E_R$, should be sufficiently high to prevent the cis-isomer from reverting to its trans-isomer under operating conditions, but low enough to allow the conversion to be triggered readily.
4. The photochemical reaction and the reverse thermal reaction should be efficient and without competing side reactions. In addition, both isomers should be resistant to deterioration by decomposition or other side reactions under operating conditions.
5. Both cis- and trans-isomers should be extremely soluble, desirably and preferably in the order of at least 60–80 percent (w/v) soluble, in the solvent liquid used. The greater the solubility, the higher the amount of energy that can be stored in a given volume.
6. The system, in part or as a whole, should present no undue health or safety hazards. Thus, the cis- and trans-isomers desirably should be non-toxic at the concentrations employed.

To aid in arriving at and selecting a particular photochemical material to employ in the invention, it is possible upon preselection of a storage time and operating temperature to use the Arrhenius equation, $$\ln k = \ln A - \Delta E_R/RT,$$

and calculate an estimated activation energy, $\Delta E_R$, required for the photochemical material wherein the isomerization of concern is a unimolecular isomerization and $k$ is a first-order rate constant. By such an estimating manner and for a storage lifetime of 2 days and an operating temperature of about 27° C (80° F), the employed photochemical material should have an activation energy of about 25 kcal/mole. Generally, this activation energy does not vary greatly as operating temperature is varied. The employed photochemical material's activation energy is related closely to the ease of "triggering" the reverse reaction for release of the stored energy, assuming that a catalyst is not used to induce the reaction. By way of example, one also can estimate the temperature required to trigger the cis to trans thermal reaction within a given time period. For example, choosing a value of $E_R$ = 28 kcal/mole, if a 10-second triggering time is desired, one can employ a triggering temperature of 170° C (338° F) and likely would pressurize the system to avoid boiling the employed aqueous liquid. It should be recognized though, if energy release is induced by a catalyst, that the activation energy becomes a far less significant parameter than in a thermally triggered system. This is because the catalyst reduces the effective activation energy for the reaction, thus uncoupling the ease of triggering from the problem of storage lifetime.

The photochemical isomerizable compound employed in the invention has the following properties:

1. The compound will undergo a geometrical isomerization, upon the exposure to light of wavelengths between 350 nm and 1200 nm, from a thermodynamically stable isomer of lower energy content (herein referred to as T) to a thermodynamically less stable but kinetically stable isomer of higher energy content (herein referred to as C);
2. The absorbance maximum of C occurs at shorter wavelengths than that of T;
3. The absorbance maximum of T lies within the range 350 nm to 800 nm;
4. The ground-state enthalpy content of C is at least 10 Kcal/mole greater than that of T;
5. C can be made to revert back to T by means of a thermal initiation, which may be catalyzed or uncatalyzed, such that in doing so the higher enthalpy content of C will be released in the form of heat;
6. The activation energy for the thermal reversion of C to T is at least 20 Kcal/mole.

The compound further is characterized by a rigid linkage connecting structural moieties, which in combination with the linkage, are adaptable to undergoing geometric isomeric conversion as noted by the illustrated overall gross structures thereof of

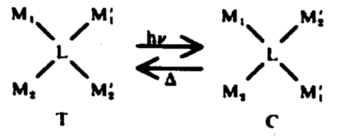

wherein

L is the rigid linkage, which may be carbon-carbon double bond or several such bonds, a carbon-nitrogen double bond or several such bonds, a cyclopropane or cyclobutane ring system, or a combination of these linkages; $M_1$, $M_2$, $M_1'$, and $M_2'$ are structural moieties which may be hydrogen, alkyl, aryl, or heteroaromatics; $M_1$ and $M_2$ (or $M_1'$ and $M_2'$) together may also be an aromatic or heteroaromatic ring system. Illustrations of, but not limited to, are the examples below:

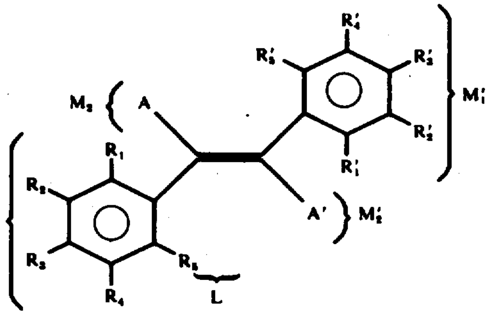

wherein

A and A' may be H, alkyl, or aryl, $R_1$, $R_1'$, $R_5$, and $R_5'$ may be H, alkyl, alkoxy, $SO_3^-$ or some combination of these groups, $R_2$, $R_2'$, $R_4$, and $R_4'$ may be H, alkyl, alkoxy, $NX_3^-$ (where X is H or alkyl), $SO_3^-$, halogen, or some combination of these groups, $R_3$ and $R_3'$ may be H, alkyl, aryl, aroyl, alkoxy, aryloxy, nitro, amino, dialkylamino, or some combination of these groups, and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together, or $R_4$ and $R_5$ (or $R_4'$ and $R_5'$) together may be an aromatic ring system either carbocyclic or heterocyclic;

and

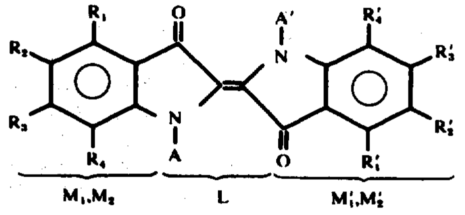

wherein

A and A' may be a $C_2$ or higher lower alkyl, haloalkyl, alkoyl, haloalkoyl, aryl, haloaryl, aroyl, heteroaroyl, —$SO_2$—haloalkyl, —$SO_2$—aryl, —$SO_2$—haloaryl, or

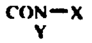

(wherein X and Y may be H, alkyl, aryl, or a combination of these three), or a substituted aroyl wherein the substituents may be nitro, alkoxy, aroyloxy, sulfinyl, carboxy, dialkylamino, halo, or combination thereof;

$R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ (where X is H or alkyl), alkoyl, aroyl, or a combination of these groups; and $R_1$ and $R_2$ (or $R_1'$ and $R_2'$) together or $R_2$ and $R_3$ (or $R_2'$ and $R_3'$) together, or $R_3$ and $R_4$ (or $R_3'$ and $R_4'$) together may be an aromatic ring system either carbocyclic or heterocyclic.

DETAILED DESCRIPTION AND PREFERRED EMBODIMENTS OF THE INVENTION

Figure 1:
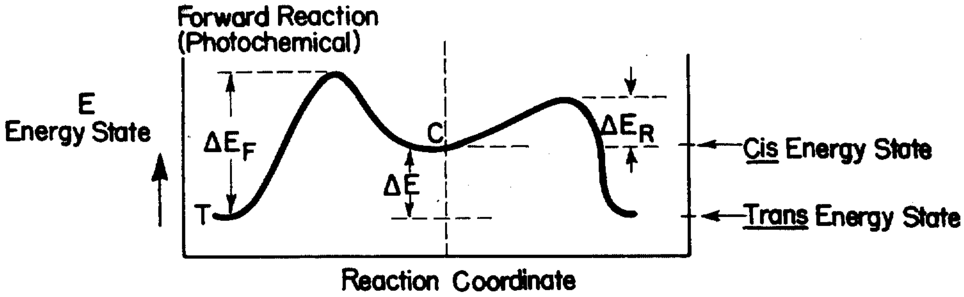
Figure 2:
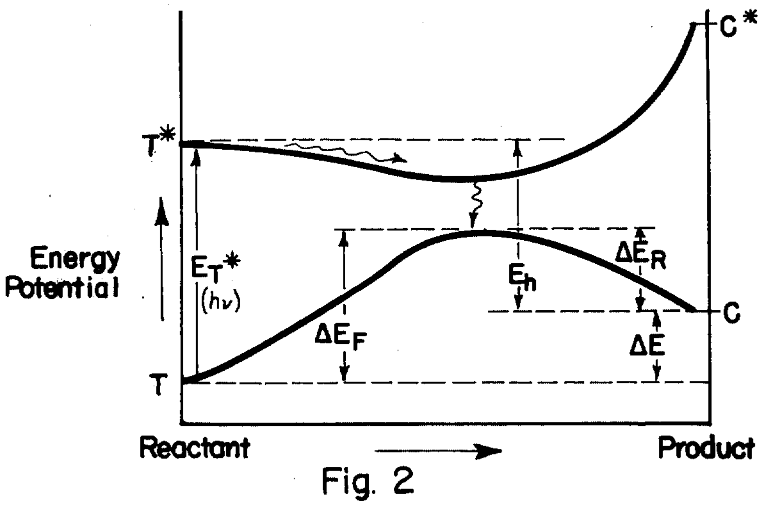

More particularly, the invention's process employs therein as its photochemical isomerizable compound, an organic compound (a) which is selected from the several hereafter defined classes of compounds of:

indigo and thioindigo derivatives;
modified indigo and thioindigo derivatives;
stilbene derivatives;
cyanine-type dyes; and
modified aromatic olefins;

and (b) which possesses the properties and meets the general gross structural requirements aforedescribed.

Indigo and Thioindigo Derivatives

This class of compounds have the structures of

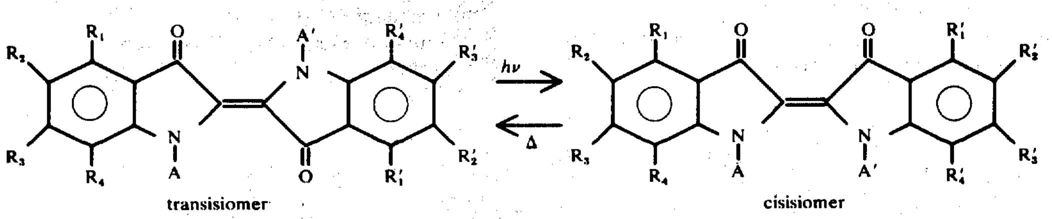

and

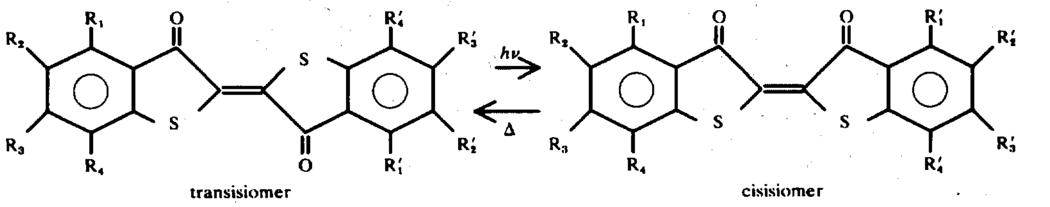

wherein

A and A' may be a $C_2$ or higher lower alkyl, haloalkyl, alkoyl, haloalkoyl, aryl, haloaryl, aroyl, heteroaroyl, $-SO_2-$haloalkyl, $-SO_2-$aryl, $-SO_2-$haloaryl, $$CON\underset{Y}{-}X$$

(where X and Y may be H, alkyl, aryl, or a combination of these three), or a substituted aroyl wherein the substituents may be nitro, alkoxy, aroyloxy, sulfinyl, carboxy, dialkylamino, halo, or combination thereof;

$R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ (where X is H or alkyl), alkoyl, aroyl, or a combination of these groups; and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together may be an aromatic ring system, either carboncyclic or heterocyclic.

An illustrative member of this class is

N,N'-bis-(2-chlorobenzoyl)indigo
N,N'-bis-(2,4-dichlorobenzoyl)indigo
N,N'-bis-(2,5-dimethylbenzoyl)indigo
N,N'-bis-(2,4,6-trimethylbenzoyl)indigo
N,N'-bis-(4-chlorobenzoyl)indigo
N,N'-bis-(3-chlorobenzoyl)indigo
N,N'-bis-(3,4-dichlorobenzoyl)indigo
N,N'-bis-(2,3,6-trichlorobenzoyl)indigo
N,N'-bis-(4-bromobenzoyl)indigo
N,N'-bis-(4-fluorobenzoyl)indigo
N,N'-bis-(4-methoxybenzoyl)indigo
N,N'-bis-(3,5-dimethoxybenzoyl)indigo
N,N'-bis-(2-ethoxybenzoyl)indigo
N,N'-bis-(3,4-methylenedioxybenzoyl)indigo ("dipiperonoylindigo")
N,N'-bis-(2,6-dimethoxybenzoyl)indigo
N,N'-bis-(3-methylbenzoyl)indigo
N,N'-bis-(4-methylbenzoyl)indigo
N,N'-bis-(2-phenylbenzoyl)indigo
N,N'-bis-(4-t-butylbenzoyl)indigo
N,N'-bis-(3-trifluoromethylbenzoyl)indigo
N,N'-bis-(3,5-ditrifluoromethylbenzoyl)indigo
N,N'-bis-(2-benzoylbenzoyl)indigo

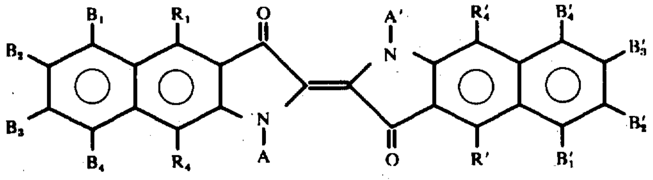

where $B_1$m $B_2$, $B_3$, $B_4$, and $B_1'$, $B_2'$, $B_3'$, $B_4'$ may be any of the groups listed above for $R_1$, $R_1'$, $R_2$, $R_2'$, $R_3$, $R_3'$, $R_4$, and $R_4'$ and $R_1$, $R_4$, $R_1'$, $R_4'$, A, and A' are as defined above.

Encompassed within the foregoing class of compounds and illustrative and representative thereof are N,N'-diacetylindigo
N,N'-dibenzoylindigo
N,N'-dipivaloylindigo
N,N'-bis-(1-adamantoyl)indigo
N,N'-bis-(4-trifluoromethylbenzoyl)indigo
N,N'-bis-(2-methoxybenzoyl)indigo
N,N'-bis-(1-naphthoyl)indigo
N,N'-bis-(2-furoyl)indigo
N,N'-bis-(cyclohexylcarbonyl)indigo
N,N'-bis-(4-nitrobenzoyl)indigo
N,N'-bis-(3-nitrobenzoyl)indigo
N,N'-bis-(3,5-dinitrobenzoyl)indigo
N,N'-bis-(2-chloro-5-nitrobenzoyl)indigo
N,N'-bis-(5-chloro-2-nitrobenzoyl)indigo
N,N'-bis-(2-chloro-4-nitrobenzoyl)indigo
N,N'-bis-(3-carboxybenzoyl)indigo
N,N'-bis-(4-carboxybenzoyl)indigo
N,N'-bis-(3,4-dicarboxybenzoyl)indigo
Thioindigo
6,6'-Diethoxythioindigo
4,4'-Dichloro-6,6'-dimethylthionindigo
6,6'-Dichloro-4,4'-dimethylthioindigo
5,5',7,7'-Tetramethylthioindigo
4,4',7,7'-Tetramethyl-5,5'-dichlorothioindigo

Modified Indigo and Thioindigo Derivates

This class of compounds are of the perinaphthoindigo and perinaphthothioindigo types and have the structures of N,N'-dibenzoylperinaphthothioindigo
N,N'-dipivaloylperinaphthothioindigo
hemiperinaphthothioindigo
N,N'-diacetylperinaphthothioindigo
N,N'-dibenzoylperinaphthothioindigo

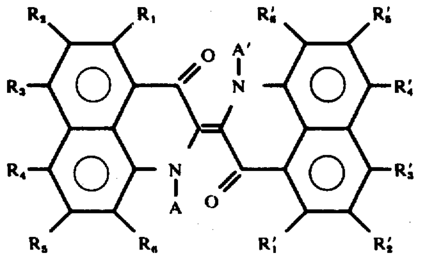

transisomer and

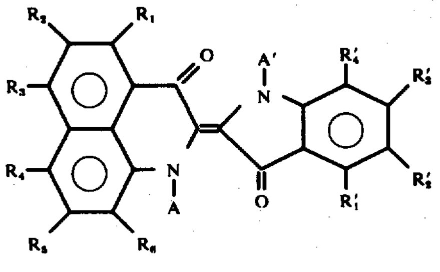

transisomer and

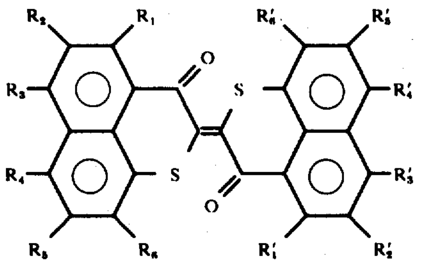

transisomer and

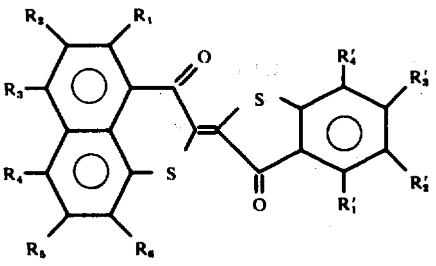

transisomer wherein

A and A' may be a $C_2$ and higher lower alkyl, haloalkyl, alkoyl, haloalkoyl, aryl, haloaryl, aroyl, heteroaroyl, $-SO_2-$alkyl, $-SO_2-$haloalkyl, $-SO_2-$aryl, $-SO_2-$haloaryl,

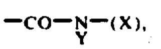

(where X, Y may be hydrogen, alkyl, or aryl, or a combination of these three), or a substituted aroyl wherein the substituents may be nitro, alkoxy, aroyloxy, sulfinyl, carboxy, dialkylamino, halo, or combination thereof; and $R_1$, $R_2$, $R_3$, $R_4$, $R_5$, $R_6$, $R_1'$, $R_2'$, $R_3'$, $R_4'$, $R_5'$, and $R_6'$ may be hydrogen, alkyl, aryl, alkoxy, arloxy, halogen, $SO_3^-$, $NX_3^+$ (where X is hydrogen or alkyl), alkoyl, aroyl, or a combination of these groups.

Encompassed within the foregoing class of compounds and illustrative and representative thereof are perinaphthothioindigo
N,N'-diacetylperinaphthothioindigo
N,N'-dipivaloylperinaphthothioindigo

Stilbene Derivatives

This class of compounds have the structures of

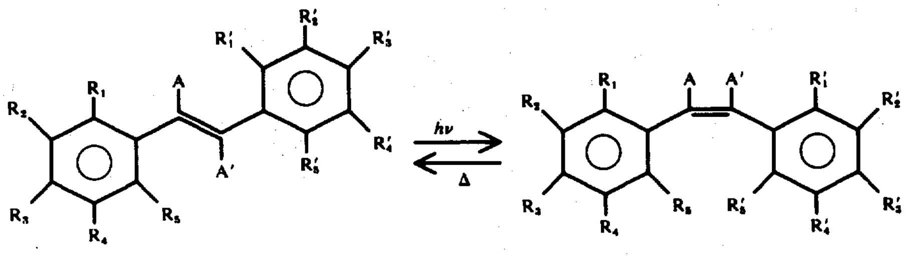

trans-isomer cis-isomer wherein

A and A' may be H, alkyl, or aryl, $R_1$, $R_1'$, $R_5$, and $R_5'$ may be H, alkyl, alkoxy, $SO_3^-$ or some combination of these groups, $R_2$, $R_2'$, $R_5$, and $R_5'$ may be H, alkyl, alkoxy, $NX_3^+$ where *x* is H or alkyl), $SO_3^-$, halogen, or a combination of these groups, $R_3$ and $R_3'$ may be H, alkyl, aryl, aroyl, alkoxy, aryloxy, nitro, amino, dialkylamino, or a combination of these groups, and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together, or $R_4$ and $R_5$ (or $R_4'$ and $R_5'$) together may be an aromatic ring system either carbocyclic or heterocyclic.

An illustrative member of this class is

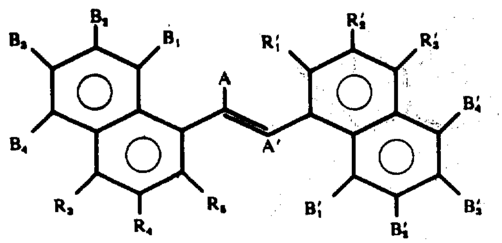

wherein $B_1$, $B_2$, $B_3$, $B_4$, and $B_1'$, $B_2'$, $B_3'$, $B_4'$ may be any of the groups listed above for $R_2$ and for $R_3$, and $R_3$, $R_4$, $R_5$, A, $R_3'$, $R_4'$, $R_5'$, and A' are as defined above.

Encompassed within the foregoing class of compounds and illustrative and representative thereof are:

Stilbene
4-Methoxystilbene
4-Dimethylaminostilbene
4-Nitrostilbene
4-Nitro-α-methylstilbene
4-Nitro-4'-methoxy-α-methylstilbene
4-Nitro-4'-methoxystilbene
4-Nitro-4'-dimethylaminostilbene
2,4-Dinitro-4'-dimethylaminostilbene
4,4'-Stilbenedicarboxylic acid
4,4'-Diphenylstilbene
1,2-Bis(1-napththyl)ethylene
1,2-Bis(2-naphthyl)ethylene
1-(2-Methoxy-1-naphthyl)-2-(1-naphthyl)ethylene
1-(4-Methoxy-1-naphthyl)-2-(1-naphthyl)ethylene
4,4'-Dinitro-2,2'-stilbenedisulfonic acid, disodium salt
4,4'-Diamino-2,2'-stilbenedisulfonic acid
4-Dimethylaminostilbene, hydrochloride salt

Cyanine-Type Dyes

These compounds have the structures of

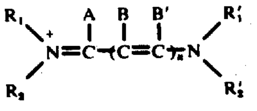

and

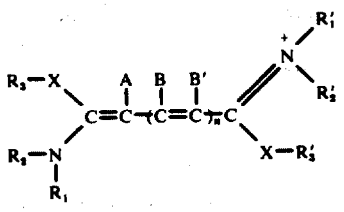

wherein

*n* may be 0, 1, 2, or 3;

X may be oxygen, sulfur, or selenium;

A, B, and B' may be hydrogen, alkyl, alkoxy, aryl, aryloxy, halogen, or a combination of these groups;

$R_1$, or $R_2$, $R_3$, $R_1'$, $R_2'$, and $R_3'$ may be alkyl, haloalkyl, aryl, haloaryl, alkoyl, aroyl, or a combination of these groups; and $R_1$ and $R_2$ (or $R_1'$ and $R_2'$) together, or $R_1$ and $R_3$ (or $R_1'$ and $R_3'$) together, or $R_2$ and $R_3$ (or $R_2'$ and $R_3'$) together may be a ring system, either aromatic or nonaromatic, either carbocyclic or heterocyclic.

Illustrative members of this class include

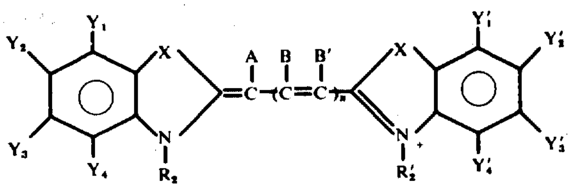

and

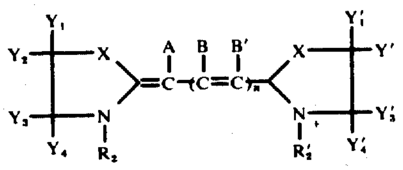

wherein $Y_1$, $Y_2$, $Y_3$, $Y_4$, $Y_1'$, $Y_2'$, $Y_3'$, $Y_4'$ may be hydrogen or any of the groups listed above for $R_1$, $R_2$, $R_3$, $R_1'$, $R_2'$, and R', or a combination of these groups, and $R_2$, $R_2'$, A, B, B' are as defined above.

Encompassed within the foregoing class of compounds and illustrative and representative thereof are 3,3'-Diethyloxacyanine iodide
3,3'-Diethyloxathiacyanine iodide
3,3'-diethylthiacarbocyanine iodide
2-(p-Diethylaminostyryl)-pyridylmethyl iodide
1,1'-Diethyl-2,2'-pyridylcyanine iodide
5-(1'-Ethyl-4'-quinolinylidene)-3-ethylrhodanine
2,4-Di-(p-dimethylaminostyryl)-pyridylethyl iodide
3-Methyl-3'-ethyloxathiacarbocyanine iodide
2-(p-Dimethylaminostyryl)-quinolylethyl p-tosylate
3,3'-Diethyl-9-methylthiacarbocyanine bromide
3,3'-Diethyl-9-ethylthiacarbocyanine p-tosylate
3,3'-Dimethylthiacarbocyanine iodide
3,3'-Diallylthiacarbocyanine bromide
1,1'-Diethyl-2,2'-carbocyanine chloride
3,3'-Diethyl-9-methyl-4,5,4',5', dibenzthiacarbocyanine bromide
1,3'-Diethyl-2,2'-quinolylselenacarbocyanine iodide
1,1'-Diethyl-4,4'-cyanine iodide
1,1'-Diisoamyl-4,4'-cyanine iodide
1,1'-Diethyl-2,2'-carbocyanine bromide
1,1'-Diethyl-2,2'-carbocyanine iodide
3,3'-Diethylthiadicarbocyanine iodide
3,3'-Diethylthiatricarbocyanine iodide
1,1'-Diethyl-2,2'-tricarbocyanine iodide

Modified Aromatic Olefins

These compounds have the structures of

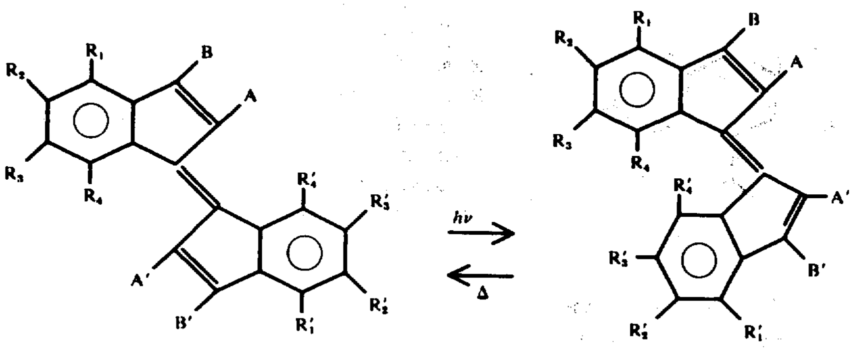

Transisomer Cisisomer wherein

A, A', B, and B' may be H, alkyl, aryl, alkylsulfonyl, arylsulfonyl, alkylcarboxyl, $NX_3^+$ (where X is H or alkyl), or a combination of these groups, R', $R_1'$, $R_4$, and $R_4'$ may be H, alkyl, alkoxy, aryl, aryloxy, $NX_3^+$ (where X is H or alkyl), $SO_3^-$, halogen or a combination of these groups, $R_2$, $R_2'$, and $R_3'$ may be H, alkyl, aryl, alkoxy, aryloxy, aroyl, nitro, dialkylamino, $SO_3^-$, alkylsulfonyl, $NX_3^+$ (where X is H or alkyl) or a combination of these groups, and A and B (or A' and B') together, or $R_1$ and B (or $R_1'$ and B')together, or $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together may be an aromatic ring system either carbocyclic or heterocyclic.

An illustrative member of this class is

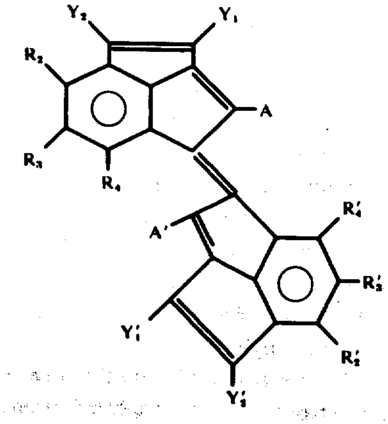

where $Y_1$, $Y_2$, $Y_1'$ and $Y_2'$ may be of any of the groups listed above for $R_1$ and for $R_2$, and $R_2$, $R_3$, $R_4$, $R_2'$, $R_3'$, and $R_4'$ are as defined above.

Encompassed within the foregoing class of compounds and illustrative and representative thereof are 1,1'-Biindanylidene 1,1-Biaciidanylidene Of the foregoing by name-listed illustrative and representative stilbene derivatives, several are available from commercial sources, others are reported in literature and thus preparable by their literature reported synthesis, and the remainder are preparable using known reactions, procedures, techniques, and the like for their synthesis. Syntheses of several stilbene derivatives are described below. These syntheses are illustrative of the procedures useful for the preparation of compounds of this class.

| Compound | Structure |
| --- | --- |
| 1. 4-Dimethylaminostilbene | 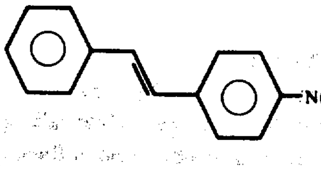 |

-continued

| Compound | Structure |
|---|---|
| 2. 1,2-Di-1-naphthylethylene | 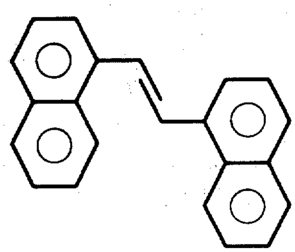 |
| 3. 1,2-Di-2-naphthylethylene | 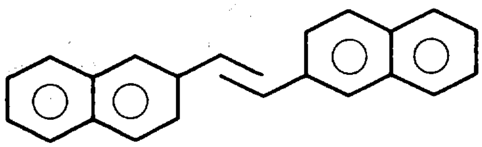 |
| 4. 4-Dimethylaminostilbene-2,2' disulfonic acid | 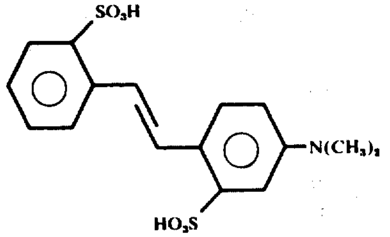 |
| 5. 1-(2-Methoxynaphthyl)-2-naphthylethylene | 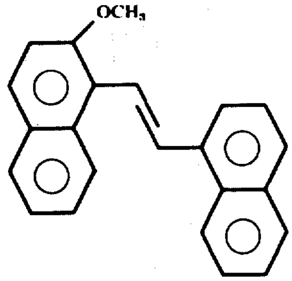 |
| 6. 1-(4-Methoxynaphthyl)-2-naphthylethylene | 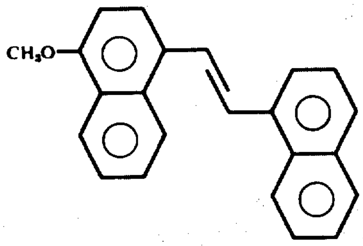 |

Compound 1 is prepared by condensation of phenylacetic acid with p-dimethylaminobenzaldehyde in piperidine at 160° C. Under these conditions the intermediate 2,3-disubstituted acrylic acid is not isolated but spontaneously decarboxylates. After several recrystallizations from ethanol, a yield (35 percent based on aldehyde) of product is isolated; mp 147°-148° C. Elemental analysis gives C 86.1, H 7.8, N 6.2, calcd. for $C_{16}H_{17}N$ C 86.1, H 7.6, N 6.3. Its infrared spectrum is consistent with the structure.

Compound 2 is prepared by the condensation of sodium α-napththylacetate with α-naphthaldehyde in acetic anhydride at 130° C for 8 hours. Some trans-1,2-di(1-naphthyl)ethylene is produced from the reaction and is crystallized from alcohol to yield a yellow crystalline solid, mp. 162°-163° C. Elemental analysis C 94.2, H 5.9, calculated for $C_{22}H_{16}$, C 94.3, H 5.7. The infrared spectrum of the product is consistent with this product's structure. The principal product of condensation is 2,3-di(1-naphthyl)acrylic acid which is isolated and purified by recrystallization from water as its sodium salt. The free acid (7 percent yield) is recrystallized from acetic acid. A relatively low yield may in part be accounted for by some difficulties in phase separation in the workup. The method used for preparation of compound 2 likely would have provided a higher yield, but this procedure is appropriate to permit isolation of the cis-olefin on decarboxylation of the acrylic acid. The acid is decarboxylated by heating in boiling quinoline with copper chromite catalyst for 1 hour. The resulting product, which appears to be mainly the desired cis-isomer contaminated with a small amount of trans, has mp. 98–105 C; the literature value is 103–104 C (Everett et al, J. Chem. Soc., 601 (1948).

Compound 3 also is preparable by the method used for 2 and from the amount of the sodium salt of 2,3-di-(2-naphthyl)-acrylic acid isolated, in a yield superior to the yield for 5 and 6.

Compound 4 is preparable by condensation of sodium 2-methyl-4-nitrobenzenesulfonate with an equimolar amount of sodium benzaldehyde-2-sulfonate in DMF with 10 percent piperidine at about 100° C for 64 hours. A red crystalline product (crystallized from acetic acid) displays an unexpected carbonyl absorption in the infrared but does exhibit other features to be expected of the desired compound.

Products 5 and 6 are preparable by the same procedure used for 2. The yields, however, to date are very poor based upon the amount of substituted acrylic acid salt isolated and an appreciable quantity of unreacted methoxynaphthaldehyde recovered. The method used for 1 could represent a better synthesis route to these compounds.

Of the other foregoing illustrative and representative photochemical isomerizable compounds listed by name for the other preceding several defined classes thereof, a few are available from research laboratories, others or closely similar compounds are reported in literature and preparable by their literature reported teachings, and the remainder are preparable using known reactions, procedures, techniques, and the like for their synthesis. For example the N,N'-diacylindigo derivatives typically are preparable by the method of Poaner (Chem. Ber., 59, 1815 (1926), in which indigo and the appropriate acid chloride are refluxed together in pyridine; quenched by pouring into dilute aqueous hydrochloric acid; filtering and drying; and extracting with ethyl alcohol. The product is recrystallized from an appropriate solvent, such as acetonitrile, dimethyl formamide, benzene/chloroform mixtures, and the like.

N,N'-dimethylindigo and N,N'-dibenzylindigo are preparable by the method of Van Alphen (Rec. Trav. Chem., 61, 201 (1942)), while N,N'-dibenzylindigo is preparable using the procedure of Friedlander and Kung (Chem. Ber., 55, 1597 (1922)). In all cases, these derivatives are recrystallized (and/or chromatographed on aluminum or silica gel) until pure to thin-layer chromatography before their employment in the invention.

While water generally will be the sole and/or predominant liquid medium within which the employed photochemical organic isomerizable compound is dissolved and/or dispersed for exposure to solar radiation and practice of the invention, there will exist some instances wherein some of the aforedefined compounds will not be as soluble in water as desired for efficient practice of the invention. Preferably the employed photochemical compound for satisfactory solubility will have at least 60 gm thereof soluble in each 100 ml. of the employed liquid at the temperature of solar irradiation thereof. For economy and safety in practice of the invention, the employment of a liquid which predominantly consists of water is desired and preferred. Thus, the invention employs a liquid medium which comprises from 50 to 100 percent by volume of water. The balance of the liquid medium, i.e., up to 50 percent by volume is a lower alkyl alcohol, such as methanol, or a lower alkyl polyalcohol, such as ethylene glycol, or mixture thereof. Where the employed photochemical organic isomerizable compound upon employment of a water/alcohol mixture or water/glycol mixture or mixtures thereof within the aforestated proportions still is not as soluble therein as requisite for practice of the invention, then the to-be-employed compound is made more soluble by chemically modifying it through using known methods to introduce water-solubilizing substituents into the compound. Thus, a photochemically active material, M, may be made soluble in the employed aqueous solvent medium by the introduction of water-solubilizing groups, X, as exemplified by $$M-(X)_n$$

wherein

*n* is a whole number integer up to 6 ,

X may be $N^+Y_3$ (where Y may be hydrogen, alkyl, aryl, or a combination of these groups), $SO_3^-$, $CO_2^-$, $PO_4^=$, hydroxyl, or a combination of these groups.

By employment of such liquids and procedures, the invention is operative with distinct advantages of economy, fire safety, and health safety over using liquids which are purely solvating organic liquids per se or which comprise predominantly solvating organic liquids.

The invention includes not only selecting an employable photochemical isomerizable organic compound possessing those properties suitable and requisite for practice of the invention from the aforedefined classes of photochemical isomerizable organic compounds as well as, by known means, varying and placing of suitable substituents thereon and modifications of the photochemical compounds encompassed there within to make these compounds suitable, but the invention also includes employing a sensitizer in an amount up to 10 percent by weight of the compound along with the compound in its solubilizing aqueous liquid for exposure to solar radiation. By including a sensitizer along with the photochemical isomerizable organic compound, one extends the useful wavelength range for photochemical solar energy storage to longer wavelengths than can be utilized by the photochemically active compounds themselves. This is accomplished by means of a known technique of photochemical sensitization. For this technique to be useful, the energy storage reaction must occur not from the excited singlet state (which is produced directly from the absorption of light) but from a lower lying excited triplet state. By way of example, it has been established in the literature (see, for example D). Schulte-Frohline, H. Blume and H. Gusten, J. Phys. Chem. 66, 2486 (1962); D. Gegiou, K. A. Muszkat, and E. Fischer, J. Amer. Chem. Soc., 90, 3907 (1968); J. Saltiel, in "Organic Photochemistry", Vol. III, O. Chapman, Ed., Marcel Dekker, Inc., New York, 1973, Chapter 1, that this condition holds for the photochemical trans-cis isomerization of stilbenes containing substituents such as halogens, nitro groups, and carbonyl groups.

Figure 3:
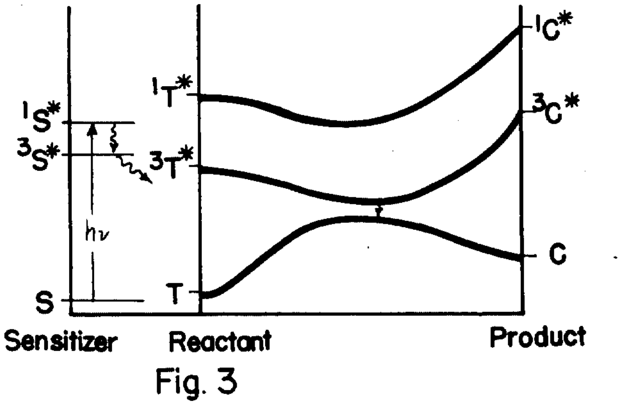

With reference to FIG. 3 for explanation of the energetics of triplet sensitization, the characteristic property of a useful sensitizer is that it absorbs relatively long-wavelength light (lower singlet state energy $^1S^*$ than that of $^1T^*$) and then rapidly relaxes to a triplet state $^3S^*$ with an energy greater than that of $^3T^*$ but lower than that of $^3C^*$. This is illustrated schematically in FIG. 3. The energy contained in $^3S^*$ can then be transferred to T during a collision, to form $^3T^*$ directly and regenerate the ground state sensitizer, S. Tables of data are available in the photochemical literature (see, for example, P. S. Engle and B. M. Monroe, in "Advances in Photochemistry", Vol. 8, J. N. Pitts, Jr., G. S. Hammond, and W. A. Noyes, Jr., Eds., Wiley-Interscience, New York, 1971, Chapter 6, each of which are incorporated herein by this mention thereof) for a wide variety of sensitizers, listing the energies of $^1S^*$ and $^3S^*$, the efficiency of forming $^3S^*$, and any competing reactions which may accompany energy transfer. Thus, a selection of appropriate sensitizers readily may be made for the isomerization reactions of concern to the invention. For example, benzophenone or fluorenone can be used effectively to sensitize isomerizationn of stilbene derivatives.

As applied to the present invention's photochemical solar energy storage, the use of sensitizers provides the advantage that a greater proportion of the solar spectrum can be utilized than is possible without the sensitizer. This is because the sensitizer will absorb light of longer wavelength than will the photochemically active material and subsequently will transfer the light energy (or a good portion thereof) to the photochemically active material in a manner effective to convert trans-isomer to cis-isomer.

As described earlier herein, after the solar energy has been absorbed by the trans-isomer so as to convert the trans-isomer to the higher energy containing cis-isomer of the employed photochemical isomerizable material, the cis-isomer subsequently is triggered thermally (i.e., by heat application) to convert it back to the trans-isomer exothermically with in so doing a portion of the exothermically produced heat being utilized to continue exothermal conversion. Another portion of the exothermically produced heat, most generally the remainder of the heat not required to continue exothermal conversion of cis-isomer to trans-isomer, than is transferred, such as by a conventional heat exchanger or the like away from the region of exothermal conversion for availability for useful thermal energy applications, e.g., heating, operating of absorption refrigeration or air conditioning and the like. A convenient manner in which the foregoing is accomplished involves heating a small volume of the cis-isomer to the point at which the reverse reaction becomes self-sustaining (or cascades), since more heat is released in the reaction than is required to initiate it. The remaining cis-isomer can then be fed into the self-heated (or catalytic) triggering means at such a rate so as to keep the reaction self-sustaining while enabling excess heat to be removed as by means of a heat-exchanger for subsequent utilization of the heat in excess of that for continuing the reverse reaction.

Also as at least mentioned earlier, the thermal triggering (or conversion) of the cis-isomer to the trans-isomer can be promoted through the employment of a catalyzed heat triggering or conversion. A catalytic triggering effectively lowers the requisite activation energy for the cis-to-trans-isomer conversion and simplifies whatever heat-triggering means one employs in the invention. Thus, photochemical isomerizable materials which ordinarily can require a high temperature (i.e., considerable heat initiation) can in principle be heat triggered at a much lower temperature, and in some instances at ambient temperature or only slightly higher than ambient temperature when the cis-isomer is brought into contact with a requisite catalyst. Likewise, where the heat conversion from cis-isomer to trans-isomer can in some instances extend over a period of days, the presence of the appropriate and requisite catalyst can greatly increase the speed of conversion. Thus, employment of a catalytic heat conversion provides significant advantages in reduction of heat to the cis-isomer to effectuate its conversion as well as increasing the speed and/or providing means for control of the rate of conversion of cis-isomer to trans-isomer.

The geometrical isomerizable compound employed in the invention's method has heretofore in this disclosure been defined as possessing certain properties and as being selected from compounds possessing those properties and having a heretofore defined structural formulae. Upon employing catalytic conversion, the property of activation energy of the employed cis-isomer no longer need be restricted by the temperature required for purely thermal triggering, but now can be as high as 40–45 Kcal/mole and possibly higher. The materials which function as useful catalysts to initiate or induce release of energy from the cis-isomer at a temperature requisite in the absence of the catalytic material are characterized by the presence of strongly acidic moieties, either present as defect sites in the crystal structure of the catalyst or present as molecular groups chemically bound to the catalyst. These acidic moieties can be either Lewis acids or proton acids. The following Table 1 presents an illustrative and representative list of catalysts meeting these requirements to define the class of catalysts useful in the invention.

TABLE 1

| Effective Catalysts |
|---|
| Metal oxides having Lewis acid properties, such as alumina, lead oxide, zinc oxide, and silicon oxide. |
| Metals having acidic surface sites, such as zinc metal. |
| Protonated (hydrated) forms of the above materials. |
| Mineral acids and oganic acids stronger than acetic acid; the organic acids may include the following structures |
| $R-SO_3H$ $R-CO_2H$ |
| where R = aryl, alkyl, substituted alkyl, substituted aryl, or polymer, and R is of such a size that the organic acid is insoluble in the liquid medium containing the photochemically active material. |
| Any combination of any two or more of the above catalysts. |

The catalytic materials of the above-defined class especially and particularly are effective with the aforedefined useful photochemical compound of the aforedefined classes identified as indigo and thioindigo derivatives and also modified indigo and thioindigo derivatives. These catalytic materials are effective somewhat lesser with the foredefined class identified as stilbene derivatives, and have at least some catalytic effect with photochemical isomerizable compounds in the other remaining aforedefined classes of compounds which possess the properties and structural requirements requisite for practice of the invention. Each of the catalysts in this class obviously can and is contemplated as capable of being useful when incorporated into a triggering or conversion means in any of a wide variety of gtometrics, such as in the form of grids, baffles, concentric tubes, coatings, pellets, and the like. As specific examples and representative and illustrative of the useful catalysts, there are neutral deactivated alumina, barium oxide (BaO), lead oxide (PbO), molybdenum oxide ($MoO_3$), TLC grade silica gel, zinc oxide (ZnO), granular cleaned zinc metal, and 4-toluenesulfonic acid, and mixtures thereof. Likewise, as illustrative of materials ineffective as catalysts in practice of the invention, there are neutral activated alumina, granular aluminum metal, antimony oxide ($Sb_2O_3$), cadmium oxide, calcium oxide (CaO), cobalt oxide ($Co_2O_3$), copper oxide ($Cu_2O_3$), granular iron metal, iron oxide ($Fe_2O_3$), pelleted lead metal, magnesium oxide (MgO), nickle oxide (NiO), and granular tin metal.

EXAMPLES

For simulation in the laboratory of practices of the process of the invention, there was constructed a calorimeter based on the design of Arnett et al, "J. Am. Chem. Soc.", 87, 1541 (1965). The specially constructed calorimeter also included a baseline compensator and a heater control. The calorimeter permits temperature changes in the order of 0.001° C to be detected and measured.

In the simulated practices of the invention, 200 ml of a liquid solution containing cis-isomer are in an inner jacket of the calorimeter, the employed cis-isomer being placed in the calorimeter's inner jacket and being obtained earlier upon exposure of its trans-isomer to filtered light as follows. The calorimeter's inner jacket is surrounded by an outer jacket into which are placed approximately 500 ml of liquid solution containing trans-isomer. Light from a 450-W mercury arc lamp is filtered first by a uranium glass filter to remove ultraviolet radiation, and then by a 0.02 M aqueous potassium dichromate ($K_2Cr_2O_7$) solution before striking the liquid solution containing trans-isomer. Liquid aliquots are removed from this light-irradiated trans-isomer solution after this filtered light radiation to analyze and demonstrate that a cis-isomer rich photostationary state is obtainable. Immediately following this filtered light irradiation and after composition anaylsis of aliquots of the light-irradiated solution, then 200 ml of the irradiated liquid solution, now containing cis-isomer, are transferred to the calorimeter's inner jacket. Within the calorimeter's inner jacket, the placed cis-isomer rich solution is kept stirred until thermal equilibrium is reached. Upon thermal equilibrium being reached, the cis-isomer rich solution is heat-triggered, e.g., by a known heat input, and/or catalyst triggered, e.g., by adding a catalyst, for conversion back to its trans-isomer with calorimetric measurements being taken. If desired after conversion back to its trans-isomer, the solution thereof in the calorimeter's inner jacket is able to be returned to the calorimeter's outer jacket, and the sequence repeated of exposure to the filtered light, transfer to the calorimeter's inner jacket, and conversion back to its trans-isomer. For calibration of the calorimeter, one uses an endotherm observed in the heat of solution of naphthalene by adding an accurately weighed sample of naphthalene to a solvent therefor contained in the calorimeter's inner jacket, or alternatively an exotherm produced by a resistably heated wire.

The following Table 2 presents typical data obtained from the illustrative process simulations conducted as just described on several indigo derivatives. In these simulations, benzene is used as the liquid medium, but similar results, although not necessarily identical and equivalent, are obtainable with water-soluble derivatives in the aqueous liquid medium of the invention. Likewise, the results presented are those wherein the reverse reaction is catalyzed by p-toluene sulfonic acid, but similar results, although not necessarily identical and equivalent, are obtainable by employing heat input only to activate and initiate or trigger the cis-isomer conversion to its trans-isomer.

TABLE 2

| Indigo Derivative | Concentration, M in [a] | ΔE,Kcal/ mole [b] | ΔE, cal/ gm [b] |
|---|---|---|---|
| N,N'-Dibenzoyl | $2.50 \times 10^{-4}$ | 3.2 | 6.8 |
| N,N'-bis (4-Trifluoromethylbenzoyl) | $2.50 \times 10^{-3}$ | 5.5 | 9.1 |
| N,N'-bis (4-Trifluoromethylbenzoyl) | $2.44 \times 10^{-3}$ | 4.8 | 7.9 |
| N,N'-bis (4-Trifluoromethylbenzoyl) | $2.74 \times 10^{-3}$ | 5.1 | 8.4 |
| N,N'-bis-(1-Naphthoyl) | $1.03 \times 10^{-3}$ | [d] | [d] |
| N,N'-bis-(1-Naphthoyl) | $4.37 \times 10^{-4}$ | 1.9 | 3.3 |
| N,N'-bis-(1-Naphthoyl) | $1.00 \times 10^{-3}$ | [d] | [d] |
| N,N'-bis-(1-Naphthoyl) | $3.75 \times 10^{-4}$ | 2.4 | 4.2 |
| N,N'-bis-(2-Methoxybenzoyl) | $1.00 \times 10^{-3}$ | [e] | [e] |
| N,N'-bis-(2-Methoxybenzoyl) | $1.00 \times 10^{-3}$ | 2.7 | 5.1 |
| N,N'-bis-(2-Methoxybenzoyl) | $1.20 \times 10^{-3}$ | 3.1 | 5.9 |
| N,N'-bis- (2,4,6-Trimethylbenzoyl) | ca. $1.00 \times 10^{-3}$ | [f] | [f] |

Control Experiments:

ca. 30 mg p-Toluenesulfonic acid added to 200 ml benzene: small endotherm only.

ca. 30 mg p-Toluenesulfonic acid added to 200 ml of benzene containing 10 μl of water: ca. 0.2 cal exotherm. This is approximately 1/3–1/5 the magnitude of the indigo exotherms listed above.

ca. 30 mg 4-Toluenesulfonic acid added to 200 ml of $8.9 \times 10^{-4}$ M N,N'-bis-(2-methoxybenzoyl)indigo in benzene containing 10 μl of water: ca. 0.2 cal exotherm, as above.

ca. 30 mg p-Toluenesulfonic acid added to 200 ml of ca. $1 \times 10^{-3}$ M trans-N,N'-bis-(4-trifluoromethylbenzoyl)indigo:

TABLE 2-continued

| Indigo Derivative | Concentration, M in [a] | ΔE,Kcal/ mole [b] | ΔE, cal/ gm [b] |
|---|---|---|---|
| small endotherm only. | | | |

[a] All measurements were made using 200 ml of the benzene solutions indicated. A mechanical baseline compensator was used except where noted otherwise.
[b] Assumes conversion to 100% cis at photostationary state; when the absorbance of the cis isomer at the wavelength of the trans maximum is taken into account, we find that our photostationary state mixtures frequently exceed 90% cis, so this is a reasonable assumption.
[c] Without baseline compensation.
[d] No data could be obtained, as the baseline drift was too steep to be compensated.
[e] An anomalously large exotherm, corresponding to some 92 kcal/mole and persisting for over 1-1/2 hours, was observed on this run. The cause of this anomaly, which could not be reproduced, is unknown.
[f] An attempt was made to measure the energy storage capacity of this compound in the hope that the short lifetime of the cis isomer reflected a relatively high energy content. However, the time required for thermal equilibration of the solution after irradiation (nearly 2 hours) was such that most of the cis-isomer had reverted to trans before the measurement could be made.

As further examples and in particular to substantiate the catalytic effectiveness of various useful catalytic materials, simulation experiments are carried forth with each of neutral deactivated alumina, barium oxide (BaO), lead oxide (PbO), molybdenum oxide ($MoO_3$), TLC-grade silica gel, zinc oxide (ZnO), granular cleaned zinc metal, mixtures of various of the foregoing, and p-toluenesulfonic acid. Each of the foregoing catalytic materials exhibited catalytic activity in thermal conversion of a cis-isomer rich photo-stationary state mixture of an N,N'-diacylindigo (e.g., generally N,N'-dibenzoylindigo) in benzene solution to a solution containing essentially the trans-isomer. At room-temperature and slightly higher temperatures (~30° C), the conversion to essentially pure isomer takes place in less than 30 minutes for each catalytic material listed except the molybdenum oxide wherein several hours exposure thereto is necessary for full conversion to the trans-isomer. As a comparison thereto, the same cis-isomer rich photostationary state mixtures of N,N'-diacylindigos at roomm temperatures are stable for over 24 hours with no noticeable reversion or return to trans-isomer in the absence of catalyst. Although the preceding simulations are conducted with only N,N'-diacylindigos and in a benzene solution, similar results, although not necessarily the same and equivalent, are obtainable with water-soluble derivatives corresponding thereto in the aqueous liquid medium of the invention.

We claim:

1. A process for photochemical collection and retrieval of solar energy, which process comprises the steps of:

a. exposing to solar radiation the trans-isomer of a geometrical isomerizable compound for a time sufficient to convert a significant portion thereof to its cis-isomer with the trans-isomer dissolved and/or dispersed in an aqueous liquid medium comprised of at least 50 percent by volume of water, which trans-isomer of the compound possesses the properties of undergoing geometrical isomerization to the cis-isomer upon exposure to light wavelengths between 350 nm and 1200 nm with an absorbance maxima of said light for the cis-isomer at a shorter wavelength than the absorbance maxima of the trans-isomer having the properties of an absorbance maxima lying between the wavelengths of 350 nm and 800 nm;

b. heating the cis-isomer to a temperature initiating a triggering of an exothermal conversion thereof to the trans-isomer with released thermal energy obtained; and c. containing the exothermal conversion of cis-isomer to trans-isomer through utilization of a portion of the released thermal energy and without additional heat added thereto and with another portion of the released thermal energy transferred from the region of exothermal conversion for availability for useful thermal energy application.

2. A process for photochemical collection and retrieval of solar energy, which process comprises the steps of:

a. exposing to solar radiation the trans-isomer of a geometrical isomerizable compound for a time sufficient to convert a significant portion thereof to its cis-isomer with the trans-isomer dissolved and/or dispersed in an aqueous liquid medium comprised of at least 50 percent by volume of water, which trans-isomer of the compound possesses the properties of undergoing geometrical isomerization to the cis-isomer upon exposure to light wavelengths between 350 nm and 1200 nm with an absorbance maxima of said light for the trans-isomer at a shorter wavelength than the absorbance maxima of the cis-isomer having the properties of an absorbance maxima lying between the wavelengths of 350 nm and 800 nm and with the cis-isomer having a ground-state enthalpy content at least 10 Kcal/mole higher than the ground state enthalpy content of the trans-isomer and with the cis-isomer adapted for thermal conversion to the trans-isomer with an activation energy of at least 20 Kcal/mole for said thermal conversion, and which compound is selected from those compounds possessed of the foregoing properties and having the structural formulae for the trans-isomer of 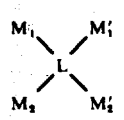

and the cis-isomer of 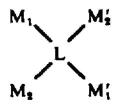

wherein

L is the rigid linkage, which may be carbon-carbon double bond or several such bonds, a carbon-nitrogen double bond or several such bonds, a cyclopropane or cyclobutane ring system, or a combination of these linkages; $M_1$, $M_2$, $M_1'$, and $M_2'$ are structural moieties which may be hydrogen, alkyl, aryl, or heteroaromatics; $M_1$ and $M_2$ (or $M_1'$ and $M_2'$) together may also be an aromatic or heteroaromatic ring system;

b. heating cis-isomer to a temperature initiating a triggering of an exothermal conversion thereof to the trans-isomer with released thermal energy obtained; and c. continuing the exothermal conversion of cis-isomer to a trans-isomer through utilizaton of a portion of the released thermal energy and without additional heat added thereto and with another portion of the released thermal energy transferred from the region of exothermal conversion for availability for useful thermal energy application.

3. The process of claim 2 in which up to 50 percent by volume of the employed aqueous liquid medium is a lower alkyl alcohol or polyalcohol, and each 100 gm of the employed aqueous liquid medium dissolves at least 60 gm of the trans-isomer at the temperature of the medium upon its exposing to the solar radiation.

4. The process of claim 3 in which the employed trans-isomer has been adapted for solvation in the employed aqueous liquid medium through chemical modification of the structure of the trans-isomer by introduction thereto of up to six water-solubilizing groups, X, wherein X may be $N^+Y_3$ (with Y being hydrogen alkyl, aryl, or combination of these groups), $SO_3^-$, $CO_2^-$, $PO_4^=$, hydroxyl, or a combination of these groups.

5. The process of claim 2 in which the employed trans-isomer is

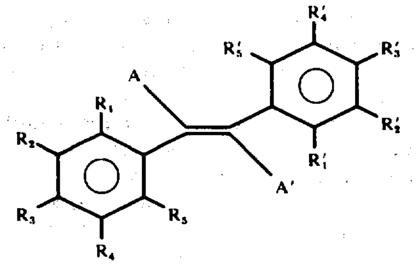

and wherein

A and A' may be H, alkyl, or aryl, $R_1$, $R_1'$, $R_5$, and $R_5'$ may be H, alkyl, alkoxy, $SO_3^-$ or some combination of these groups, $R_2$, $R_2'$, $R_4$, and $R_4'$ may be H, alkyl, alkoxy, $NX_3^-$ (where X is H or alkyl), $SO_3^-$, halogen, or some combination of these groups, $R_3$ and $R_3'$ may be H, alkyl, aryl, aroyl, alkoxy, aryloxy, nitro, amino, dialkylamino, or some combination of these groups, and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$)together, or $R_4$ and $R_5$ (or $R_4'$ and $R_5'$) together may be an aromatic ring system either carbocyclic or heterocyclic.

6. The process of claim 2 in which the employed trans-isomer is

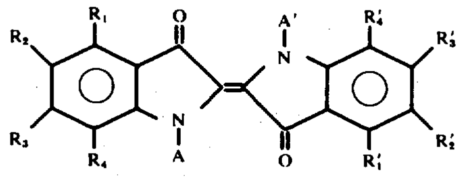

wherein

A and A' may be a $C_2$ or higher lower alkyl, haloaryl, alkoyl, haloalkoyl, aryl, haloaryl, aroyl, heteroaroyl, $-SO_2-$haloalkyl, $-SO_2-$aryl, $-SO_2-$haloaryl,

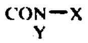

(where X and Z may be H, alkyl, aryl or a combination of these three), or a substituted aroyl wherein the substituents may be nitro, alkoxy, aroyloxy, sulfinyl, carboxy, dialkylamino, halo, or combination thereof;

$R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ where X is H or alkyl), alkoyl, aroyl, or a combination of these groups; and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together may be an aromatic ring system, either carbocyclic or heterocyclic 7. The process of claim 2 in which there is included in the aqueous liquid medium up to 10 percent by weight of a photochemical sensitizer functioning to shift the absorbance maxima of the employed trans-isomer to a longer wavelength than the absorbance maxima of the employed trans-isomer in the absence of the sensitizer.

8. The process of claim 2 in which the trans-isomer resulting from Step (c) is recycled through Steps (a), (b), and (c) of claim 2.

9. The process of claim 8 employing as the geometrical isomerizable compound an indigo or thioindigo derivative of the structures of

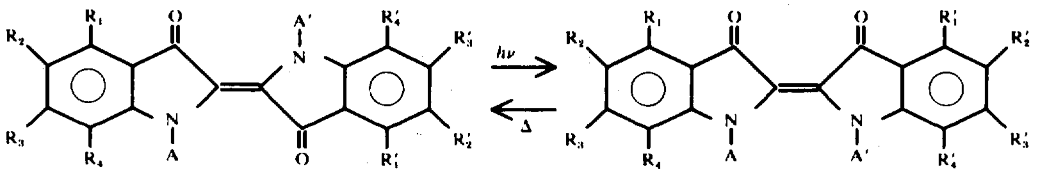

transisiomer cisisiomer or

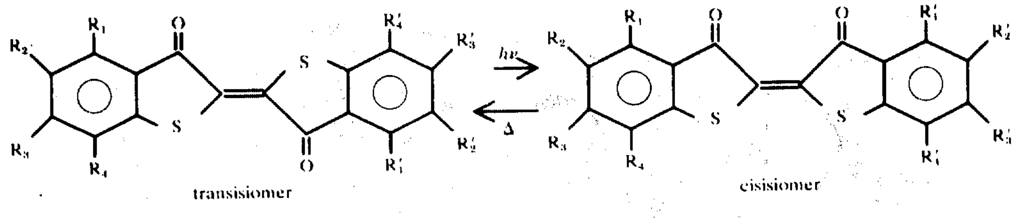

transisiomer cisisiomer wherein

A and A' may be a $C_2$ or higher lower alkyl, haloalkyl, alkoyl, haloalkoyl, aryl, haloaryl, aroyl, heteroaroyl, $-SO_2-$haloalkyl, $-SO_2-$aryl, $-SO_2-$haloaryl, or

CON—X
Y (where X and Y may be H, alkyl, aryl, or a combination of these three), or a substituted aroyl wherein the substituents may be nitro, alkoxy, aroyloxy, sulfinyl, carboxy, dialkylamino, halo, or combination thereof;

$R_1$, $R_1'$, $R_2$, $R_2'$, $R_3$, $R_3'$, $R_4$, and $R_4'$ may be H, alkyl, aryl, alkoxy, aryloxy, halogen, $SO_3^-$, $NX_3^+$ (where X is H or alkyl), alkoyl, aroyl, or a combination of these groups; and $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together may be an aromatic ring system, either carbocyclic or heterocyclic.

10. The process of claim 8 employing as the geometrical isomerizable compound a modified indigo or thioindigo derivative of the perinaphthoindigo and perinaphthothioindigo structures of

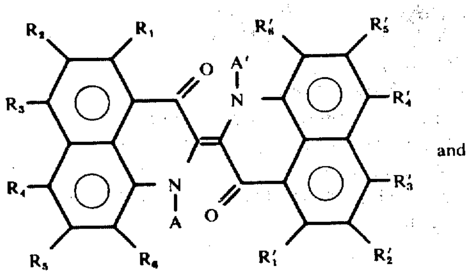

transisomer and

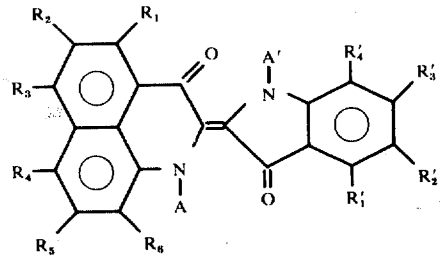

transisomer wherein

A and A' may be a $C_2$ and higher lower alkyl, haloalkyl, alkoyl, haloalkoyl, aryl, haloaryl, aroyl, heteroaroyl, $-SO_2-$alkyl, $-SO_2-$haloalkyl, $-SO_2$aryl, $-SO_2-$haloaryl, or $-CO-N-(X)Y$, where X and Y may be hydrogen, alkyl, or aryl, or a combination of these three, or a substituted aroyl wherein the substituents may be nitro, alkoxy, aroyloxy, sulfinyl, carboxy, dialkylamino, halo, or combination thereof; and $R_1$, $R_2$, $R_3$, $R_4$, $R_5$, $R_6$, $R_1'$, $R_2'$, $R_3'$, $R_4'$, $R_5'$, $R_6'$ may be hydrogen, alkyl, aryl, alkoxy, arloxy, halogen, $SO_3^-$, $NX_3^+$ (where X is hydrogen or alkyl), alkoyl, aroyl, or a combination of these groups.

11. The process of claim 8 employing as the geometrical isomerizable compound a stilbene derivative of the structures of

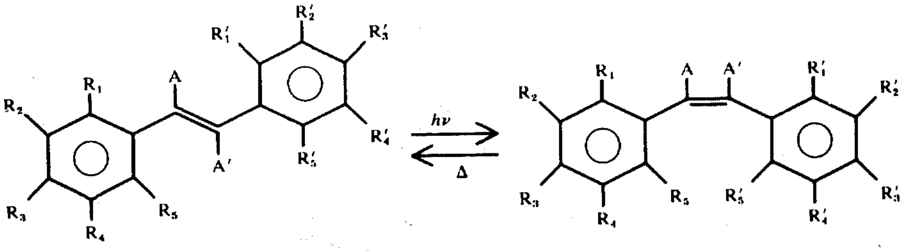

trans-isomer cis-isomer wherein

A and A' may be H, alkyl, or aryl, $R_1$, $R_1'$, $R_5$, and $R_5'$ may be H, alkyl, alkoxy, $SO_3^-$ or some combination of these groups, $R_2$, $R_2'$, $R_4$, and $R_4'$ may be H, alkyl, alkoxy, $NX_3^-$ where X is H or alkyl), $SO_3^-$, halogen, or a combination of these groups, $R_3$and $R_3'$ may be H, alkyl, aryl, aroyl, alkoxy, aryloxy, nitro, amino, dialkylamino, or a combination of these groups, and and

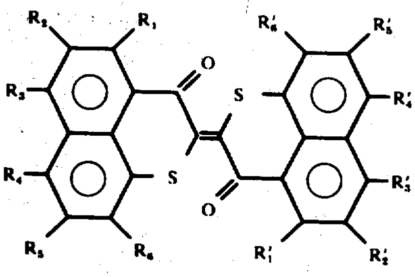

transisomer and

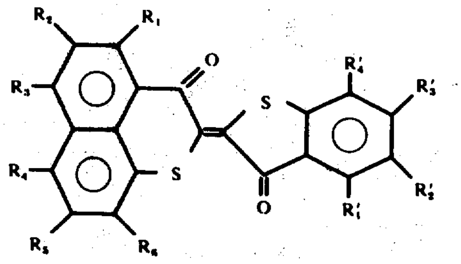

transisomer $R_1$ and $R_2$ (or $R_1'$ and $R_2'$) together, or $R_2$ and $R_3$ (or $R_2'$ and $R_3'$)together, or $R_3$ and $R_4$ (or $R_3'$ and $R_4'$) together, or $R_4$ and $R_5$ (or $R_4'$ and $R_5'$) together may be an aromatic ring system either carbocyclic or heterocyclic.

12. The process of claim 8 employing as the geometrical isomerizable compound a cyanine-type dye of the structure of

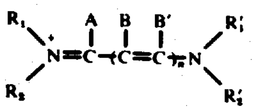

and

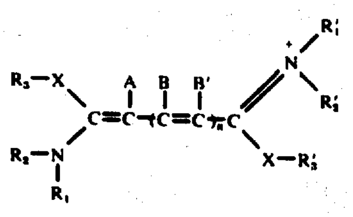

wherein

*n* may be 0, 1, 2, or 3;

X may be oxygen, sulfur, or selenium;

A, B, and B' may be hydrogen, alkyl, alkoxy, aryl, aryloxy, halogen, or a combination of these groups;

$R_1$, or $R_2$, $R_3$, $R_1'$, $R_2'$, and $R_3'$ may be alkyl haloalkyl, aryl, haloaryl, alkoyl, aroyl, or a combination of these groups; and $R_1$ and $R_2$ (or $R_1'$ and $R_2'$) together, or $R_1$ and $R_3$ (or $R_1'$ and $R_3'$) together, or $R_2$ and $R_3$ (or $R_2'$ and $R_3'$) together may be a ring system, either aromatic or nonaromatic, either carbocyclic or heterocyclic.

13. The process of claim 8 employing as the geometrical isomerizable compound a modified aromatic olefin of the structures

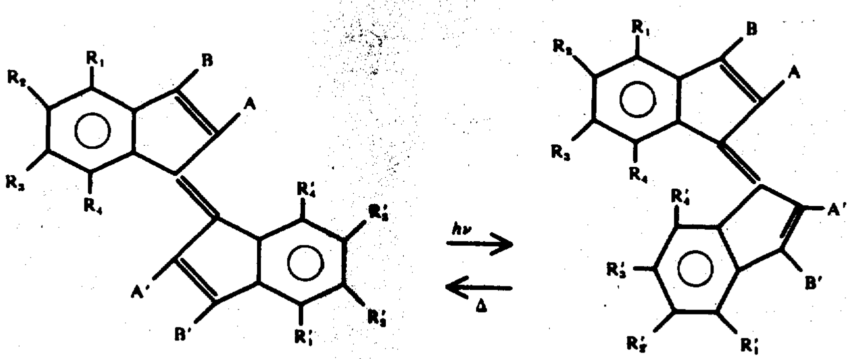

Transisomer

Cisisomer

A, A', B, and B' may be H, alkyl, aryl, alkylsulfonyl, arylsulfonyl, alkylcarboxyl, $NX_3^+$ (where X is H or alkyl), or a combination of these groups, R', $R_1'$, $R_4$, and $R_4'$ may be H, alkyl, alkoxy, aryl, aryloxy, $NX_3^+$ (where X is H or alkyl), $SO_3^-$, halogen or a combination of these groups.

$R_2$, $R_2'$, $R_3'$ may be H, alkyl, aryl, alkoxy, aryloxy, aroyl, nitro, dialkylamino, $SO_3^-$, alkylsulfonyl, $NX_3^+$ (where X is H or alkyl) or a combination of these groups, and A and B (or A' and B') together, or $R_1$ and B (or $R_1'$ and B') together, or $R_1$ and $R_2$ (or $R_1'$ and $R_2'$) together, or $R_2$ and $R_3$ (or $R_2'$ and $R_3'$) together, or $R_3$ and $R_4$ (or $R_3'$ and $R_4'$) together may be an aromatic ring system either carbocyclic or heterocyclic.

* * * * *